US008109676B2

(12) United States Patent
Zhovnirovsky et al.

(10) Patent No.: US 8,109,676 B2
(45) Date of Patent: Feb. 7, 2012

(54) FIBER OPTIC CABLE WITH HIGH INTERFACE MISMATCH TOLERANCE

(75) Inventors: Igor Zhovnirovsky, Newton, MA (US); Subhash Roy, Lexington, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 12/784,849

(22) Filed: May 21, 2010

(65) Prior Publication Data

US 2011/0200283 A1 Aug. 18, 2011

Related U.S. Application Data

(63) Continuation-in-part of application No. 12/756,087, filed on Apr. 7, 2010, which is a continuation-in-part of application No. 12/652,705, filed on Jan. 5, 2010, which is a continuation-in-part of application No. 12/581,799, filed on Oct. 19, 2009, which is a continuation-in-part of application No. 12/483,616, filed on Jun. 12, 2009.

(51) Int. Cl.
*G02B 6/38* (2006.01)
*G02B 6/26* (2006.01)
*G02B 6/32* (2006.01)
*G02B 6/36* (2006.01)
*G02B 6/44* (2006.01)
*G02B 6/00* (2006.01)

(52) U.S. Cl. .............. 385/74; 385/33; 385/73; 385/76; 385/77; 385/78; 385/88; 385/92; 385/94; 385/100; 385/139

(58) Field of Classification Search .......... 385/14, 385/31, 32, 33, 34, 70, 73, 74, 76, 88, 92, 385/93, 94, 100, 139, 77, 78
See application file for complete search history.

(56) References Cited

U.S. PATENT DOCUMENTS

| 4,427,879 | A | * | 1/1984 | Becher et al. | 250/215 |
| 2001/0048793 | A1 | * | 12/2001 | Dair et al. | 385/92 |
| 2005/0185900 | A1 | * | 8/2005 | Farr | 385/93 |
| 2008/0266638 | A1 | * | 10/2008 | Shinoda et al. | 359/237 |

\* cited by examiner

*Primary Examiner* — Brian M. Healy
*Assistant Examiner* — Hung Lam
(74) *Attorney, Agent, or Firm* — Law Office of Gerald Maliszewski; Gerald Maliszewski

(57) ABSTRACT

A fiber optic cable is provided with a cable section including at least one length of fiber optic line having a first end and a second end. A first and second plug each have a mechanical body shaped to selectively engage and disengage a jack housing. Each plug has a microlens with a planar surface to engage the fiber optic line end and a convex surface to transceive light in a first collimated beam with a jack optical interface. The fiber optic cable ends are formed in a focal plane of a corresponding plug microlens.

24 Claims, 10 Drawing Sheets

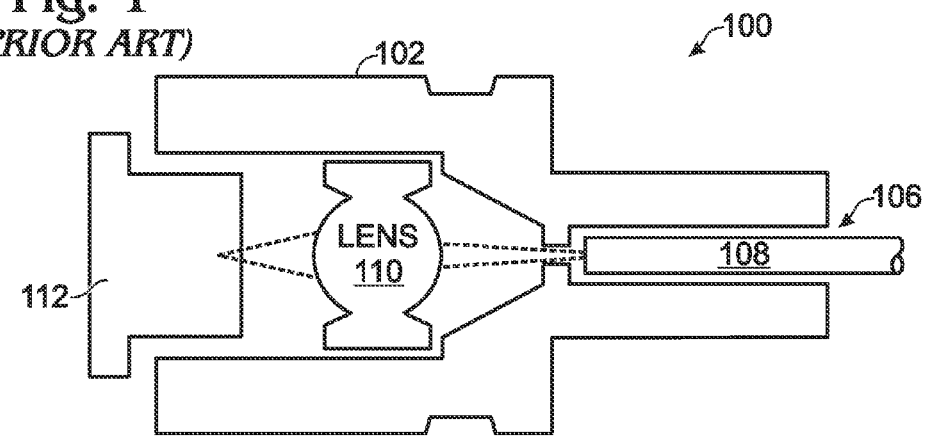
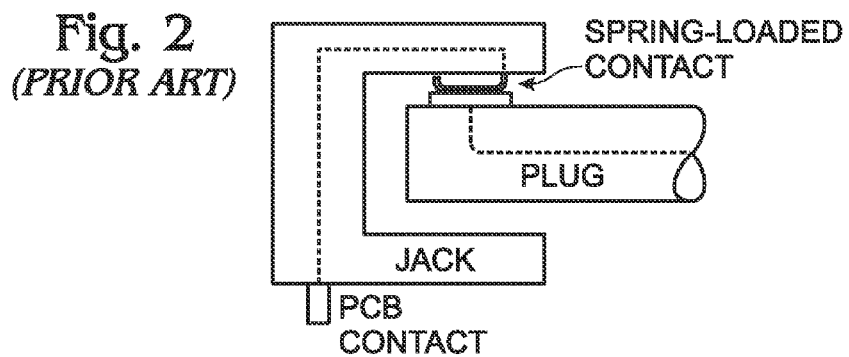
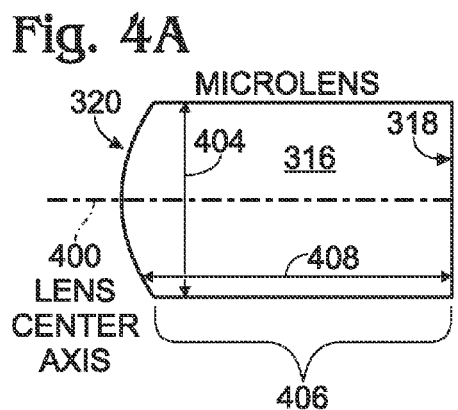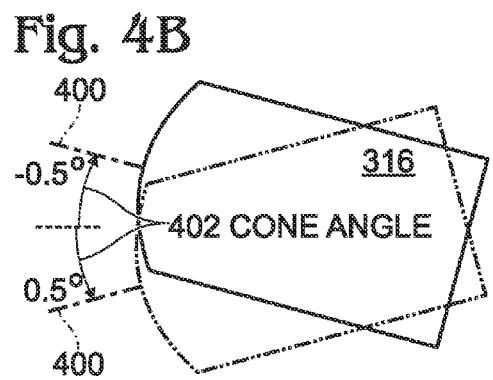

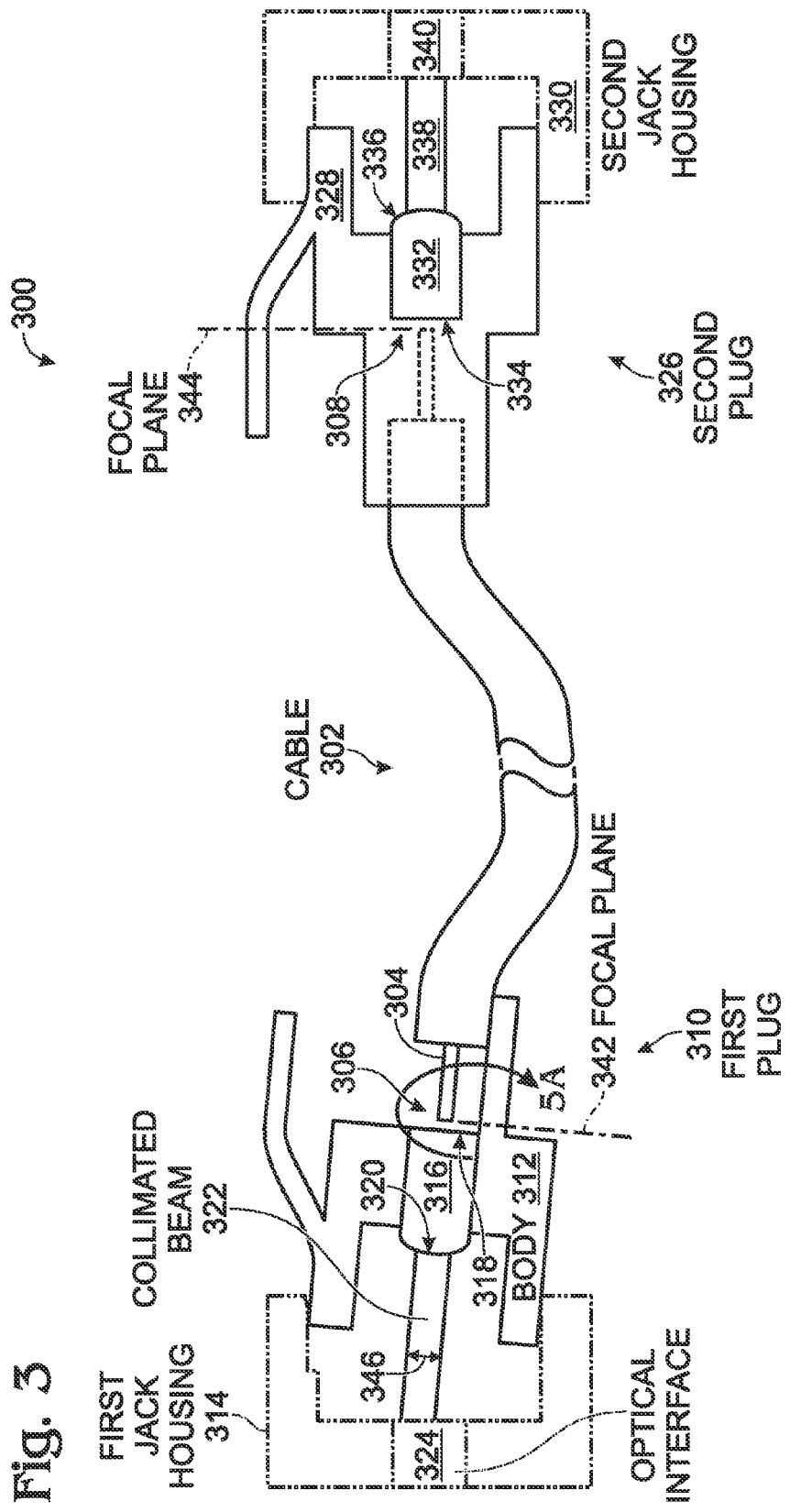

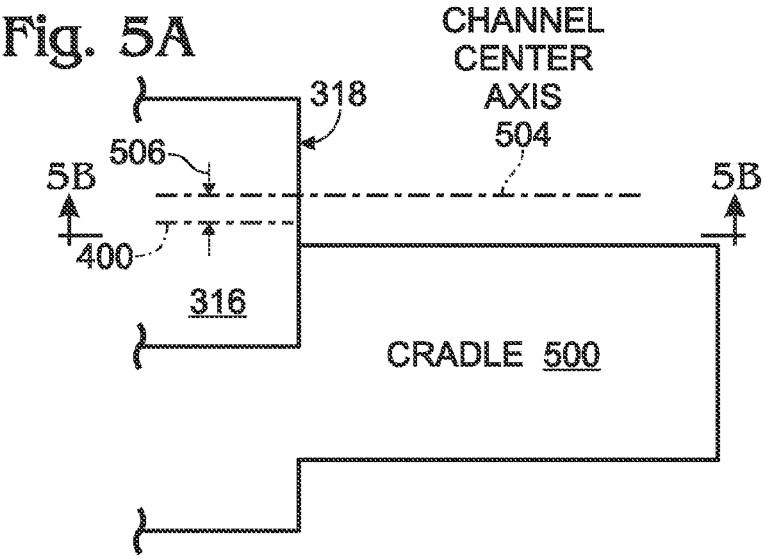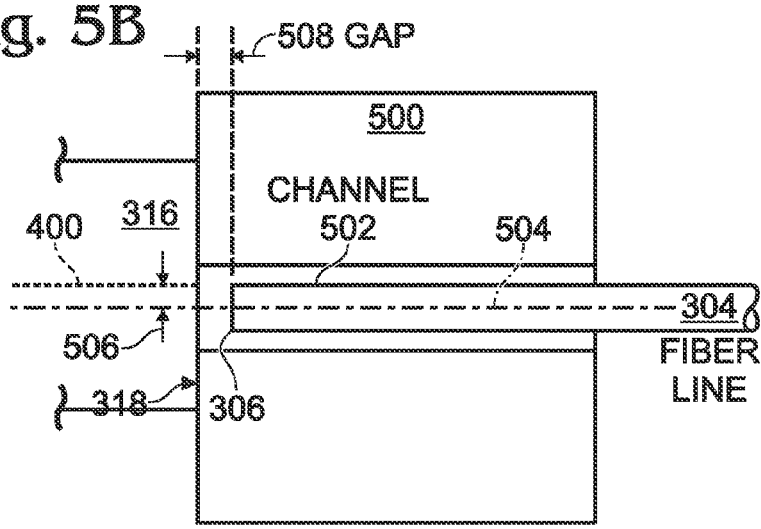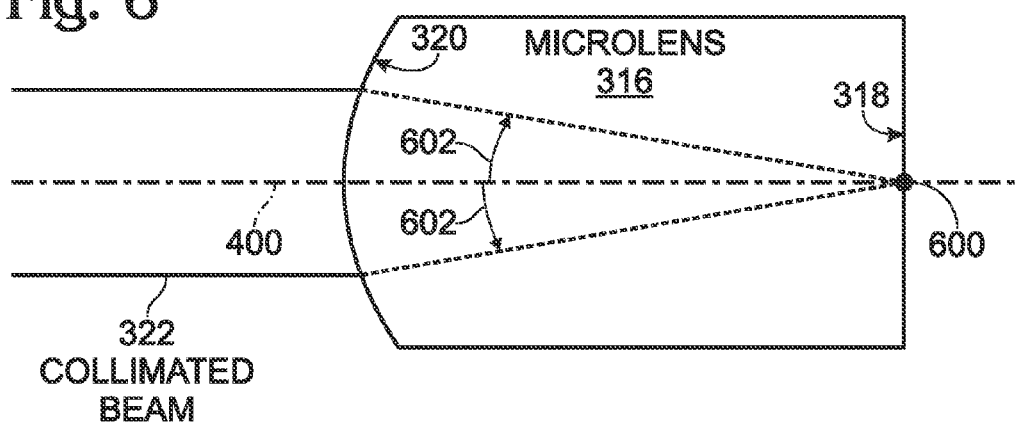

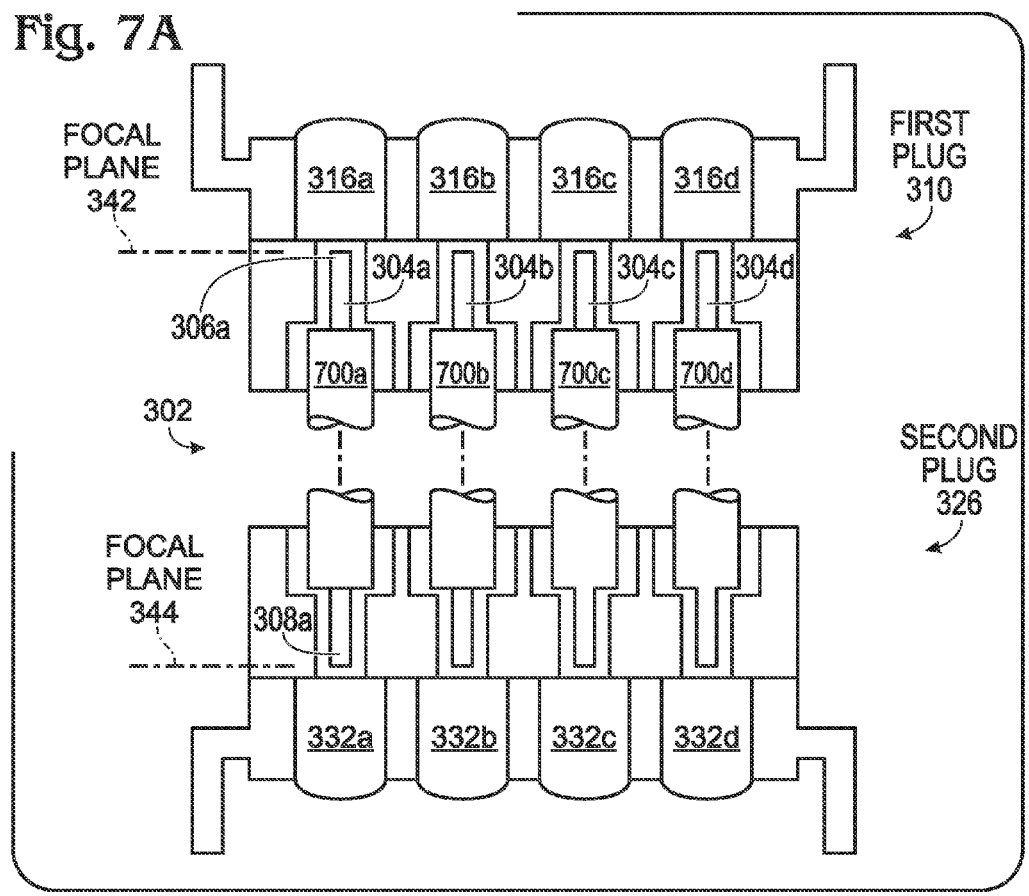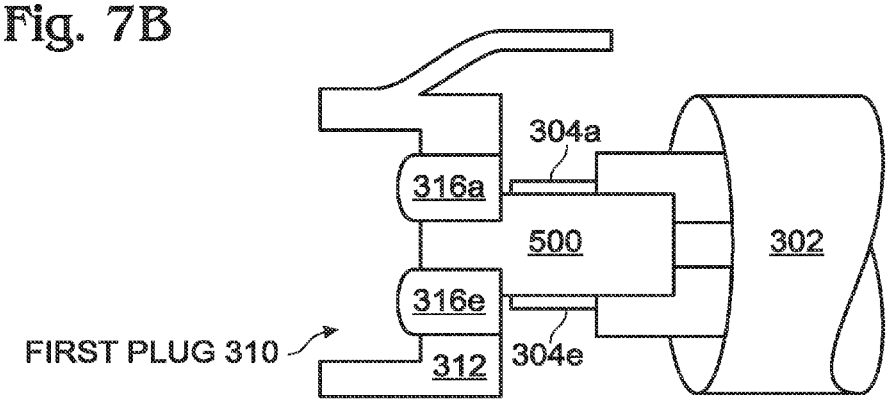

Fig. 13  IMPORTANT TOLERANCES AND THEIR EFFECT ON Tx/Rx COUPLING EFFICIENCY

|    | DESCRIPTION OF TOLERANCE | TX: EFFECTIVE FIBER DECENTER | RX: EFFECTIVE PD DECENTER |
|----|--------------------------|------------------------------|---------------------------|
| T1 | VCSEL/PD PLACEMENT ON CIRCUIT BOARD | ± 9.6 μm | ± 7.1 μm |
| T2 | CIRCUIT BOARD MISALIGNMENT | ± 9.6 μm | ± 7.1 μm |
| T3 | PLUG INSERTION ANGULAR ERROR | ± 30.3 μm | ± 21.9 μm |
| T4 | PLUG LENS PLACEMENT (IF RELATIVE TO GROOVES) | ± 14.1 μm | ± 10.3 μm |
| T5 | GROOVE PLACEMENT (IF RELATIVE TO LENS) | ± 7.1 μm | ± 5.2 μm |

US 8,109,676 B2

FIBER OPTIC CABLE WITH HIGH INTERFACE MISMATCH TOLERANCE

RELATED APPLICATIONS

This application is a Continuation-in-Part of a application entitled, PUNCH-DOWN FIBER OPTIC CABLE TERMINATION, invented by Igor Zhovnirovsky et al., Ser. No. 12/756,087, filed Apr. 7, 2010:

which is a Continuation-in-Part of a application entitled, CONNECTOR JACK PROCESSING BACKCAP, invented by Igor Zhovnirovsky et al., Ser. No. 12/652,705, filed Jan. 5, 2010;

which is a Continuation-in-Part of a application entitled, OFF-AXIS MISALIGNMENT COMPENSATING FIBER OPTIC CABLE INTERFACE, invented by Igor Zhovnirovsky et al., Ser. No. 12/581,799, filed Oct. 19, 2009;

which is a Continuation-in-Part of a application entitled, FIBER OPTIC CABLE INTERFACE, invented by Igor Zhovnirovsky et al., Ser. No. 12/483,616, filed Jun. 12, 2009. All the above-referenced applications are incorporated herein by reference.

BACKGROUND OF THE INVENTION

1. Field of the Invention

This invention generally relates to optical cables and, more particularly, to a fiber optical cable and plug connector that use a microlens to transceive light in a collimated beam.

2. Description of the Related Art

Conventionally, optical fiber connectors are spring-loaded. The fiber endfaces (optical interfaces) of the two connectors are pressed together, resulting in a direct glass to glass or plastic to plastic, contact. The avoidance of glass-to-air or plastic-to-air interfaces is critical, as an air interface results in higher connector optical losses. However, the tight tolerances needed to eliminate an air interface make these connectors relatively expensive to manufacture.

FIG. 1 is a partial cross-sectional view of a Transmission Optical SubAssembly (TOSA) optical cable plug (prior art). The plug 100 is made from a plastic housing 102 with a bored ferrule 106 to secure an optical fiber 108. The plug 100 also includes a plastic lens 110, manufactured as a subassembly, integrated into the plug. The lens 110 has a curved surface to create a focal plane where the plug mates with a jack 112. The lens permits a low loss air gap to be formed between the plug and a connecting jack. In addition to the expense of manufacturing a 2-part plug, the plug must be made to relatively tight tolerances, so that the lens focal plane aligns with the jack, which also increases the cost of the plug.

FIG. 2 is a partial cross-sectional view of an 8 Position 8 Contact (8P8C) interface (prior art). The ubiquitous 8P8C connector is a hardwired electrical connector used commercially and residentially to connect personal computers, printers, and routers. The 8P8C is often referred to as RJ45. Although the housing/body can be made as a one-piece plastic molding, the spring-loaded contacts and the necessity of cable crimping add to the complexity of manufacturing the part. Advantageously however, the spring-loaded contacts permit the part to be made to relatively lax tolerances.

As noted in Wikipedia, plastic optical fiber (POF) is an optical fiber which is made out of plastic. Conventionally, poly(methyl methacrylate) (PMMA), a transparent thermoplastic (acrylic) alternative to glass, is the core material, and fluorinated polymers are the cladding material. Since the late 1990s however, much higher-performance POF based on perfluorinated polymers (mainly polyperfluorobutenylvinylether) has begun to appear in, the marketplace.

In large-diameter fibers, 96% of the cross section is the core that allows the transmission of light. Similar to conventional glass fiber, POF transmits light (or data) through the core of the fiber. The core size of POF is in some cases 100 times larger than glass fiber.

POF has been called the "consumer" optical fiber because the fiber and associated optical links, connectors, and installation are all inexpensive. The conventional PMMA fibers are commonly used for low-speed, short-distance (up to 100 meters) applications in digital home appliances, home networks, industrial networks (PROFIBUS, PROFINET), and car networks (MOST). The perfluorinated polymer fibers are commonly used for much higher-speed applications such as data center wiring and building LAN wiring.

For telecommunications, the more difficult-to-use glass optical fiber is more common. This fiber has a core made of germania-doped silica. Although the actual cost of glass fibers is lower than plastic fiber, their installed cost is much higher due to the special handling and installation techniques required. One of the most exciting developments in polymer fibers has been the development of microstructured polymer optical fibers (mPOF), a type of photonic crystal fiber.

In summary, POF uses PMMA or polystyrene as a fiber core, with refractive indices of 1.49 & 1.59, respectively. The fiber cladding overlying the core is made of silicone resin (refractive index ~1.46). A high refractive index difference is maintained between core and cladding. POF have a high numerical aperture, high mechanical flexibility, and low cost.

Generally, POF is terminated in cable assembly connectors using a method that trims the cables, epoxies the cable into place, and cure the epoxy. ST style connectors, for example, include a strain relief boot, crimp sleeve, and connector (with ferrule). The main body of the connector is epoxied to the fiber, and fiber is threaded through the crimp sleeve to provide mechanical support. The strain relief boot prevents to fiber from being bent in too small of a radius. Some connectors rely upon the connector shape for mechanical support, so a crimp sleeve is not necessary.

First, the strain relief boot and crimp sleeve are slid onto the cable. A jacket stripping tool must be used to remove the end portion of the fiber, exposing an ara mid yarn (e.g., Kevlar™) covered buffer or cladding layer. Next, a buffer stripping tool is used to remove a section of the buffer layer, exposing the core. After mixing, a syringe is filled with epoxy. A bead of epoxy is formed at the end of the ferrule, and the ferrule back-filled with epoxy. The exposed fiber core is threaded through the connector ferrule with a rotating motion, to spread the epoxy, until the jacket meets the connector. At this point the crimping sleeve is slid onto the connector body and crimped in two places. Then, the strain relief boot can be slid over the crimp sleeve. After the epoxy cures, the core extending through the ferrule is polished with a lapping film. Then, the core is scribed at the point where it extends from the epoxy bead. The extending core potion is then cleaved from the connector and polished in multiple steps.

It would be advantageous if an optical cable jack and plug could be made more inexpensively with a relaxed set of mechanical and optical tolerances.

SUMMARY OF THE INVENTION

According, a fiber optic cable is provided comprising a cable section including at least one length of fiber optic line having a first end and a second end. A first plug includes a mechanical body shaped to selectively engage and disengage a first jack housing, and a microlens. The first plug microlens has a planar surface to engage the fiber optic line first end and a convex surface to transceive light in a first collimated beam with a first jack optical interface. Likewise, a second plug includes a mechanical body shaped to selectively engage and disengage a second jack housing, and a microlens. The second plug microlens also has a planar surface to engage the fiber optic line second end and a convex surface to transceive light in a second collimated beam with a second jack optical interface. The fiber optic cable first end is formed in the focal plane of the first plug microlens, and the fiber optic cable second end is formed in a focal plane of the second plug microlens.

In one aspect, the microlenses each have a lens center axis, and a lens axis tolerance defined by a cone angle of up to 0.5 degrees as a result of the plug mechanical body tolerances, when engaging the first jack mechanical body. In another aspect, the fiber optic cable includes a first end plug cradle, each with a channel to accept the fiber optic line end. The channel has a center axis with a tolerance of up to 30 microns with respect to the lens center axis.

Additional details of the above-described fiber optical cable, as well as a fiber optical cable plug connector are provided below.

BRIEF DESCRIPTION OF THE DRAWINGS

FIG. 1 is a partial cross-sectional view of a Transmission Optical SubAssembly (TOSA) optical cable plug (prior art).

FIG. 2 is a partial cross-sectional view of an 8 Position 8 Contact (8P8C) interface (prior art).

FIG. 3 is a diagram depicting a fiber optic cable.

FIGS. 4A and 4B are a more detailed depiction of the first plug microlens of FIG. 3.

FIGS. 5A and 5B are partial cross-sectional and plan views, respectively, of the first plug of FIG. 3.

FIG. 6 is a partial cross-sectional view of the first plug microlens of FIG. 3.

FIGS. 7A and 7B are drawings depicting a fiber optic cable with a cable section that includes a first plurality of fiber optic lines.

FIG. 13 is a table of tolerances cross-referenced to fiber lateral decentering.

DETAILED DESCRIPTION

Figure 8:
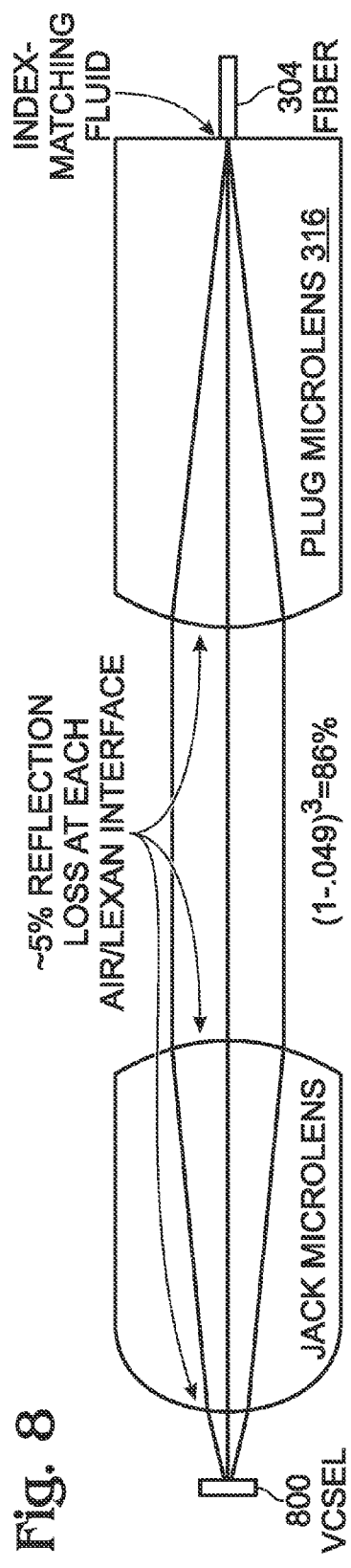
FIG. 8 is a diagram depicting communicating jack and plug microlenses.

FIG. 3 is a diagram depicting a fiber optic cable. The fiber optic cable 300 comprises a cable section 302 including at least one length of fiber optic line or core 304 having a first end 306 and a second end 308. A first plug 310 includes a mechanical body 312 shaped to selectively engage and disengage a first jack housing 314 (shown in phantom), and a microlens 316. As defined herein, the plug is mechanically engaged with the jack when the plug is fully inserted into the jack. In some aspects, a locking mechanism is enabled when the plug and jack are mechanically engaged. An RJ-45 connector is one example of such a locking type mechanical engagement (as shown). In other aspects, mechanical engagement is obtained with a pressure or friction type fit. A universal serial bus (USB) connector, microUSB, HDMI, and DisplayPort are some examples of a pressure/friction type of mechanical engagement. Alternately stated, a plug and jack are mechanically engaged when they are mated sufficiently to perform their intended electrical or optical functions.

The first plug microlens 316 has a planar surface 318 to engage the fiber optic line first end 306 and a convex surface 320 to transceive light in a first collimated beam 322 with a first jack optical interface 324. Likewise, a second plug 326 includes a mechanical body 328 shaped to selectively engage and disengage a second jack housing 330 (shown in phantom), and a microlens 332. The second plug microlens 332 has a planar surface 334 to engage the fiber optic line second end 308 and a convex surface 336 to transceive light in a second collimated beam 338 with a second jack optical interface 340.

A collimated beam is light whose rays are parallel, and therefore the beam spreads slowly as it propagates. Laser light from gas or crystal lasers is naturally collimated because it is formed in an optical cavity between two mirrors, in addition to being coherent. However, diode lasers do not naturally emit collimated light, and therefore collimation into a beam requires a collimating lens. A perfect parabolic mirror will bring parallel rays to a focus at a single point. Conversely, a point source at the focus of a parabolic mirror will produce a beam of collimated light. Spherical mirrors are easier to make than parabolic mirrors and they are often used to produce approximately collimated light. Many types of lenses can also produce collimated light from point-like sources.

The fiber optic cable first end 306 is formed in a focal plane 342 of the first plug microlens 316, and the fiber optic cable second end 308 is formed in a focal plane 344 of the second plug microlens 332. In one aspect, the first and second plug microlenses 316/332 are made from a polycarbonate resin thermoplastic such as lexan or ultem, and have respective focal lengths 342 and 344 in the range of 2 to 4 mm. The first and second plug microlenses 316 and 332 transceive the collimated beams with a beam diameter 346 in the range of 1.2 to 1.3 mm.

As used herein, a jack is the "female" connector and a plug is a mating "male" connector. Note, a portion of the first plug body has been cut away to show the fiber line 304. In some aspects, a crimping plate is connected to a cradle portion of the body, to hold the fiber line in place. See parent application Ser. No. 12/581,799 for additional details.

FIGS. 4A and 4B are a more detailed depiction of the first plug microlens of FIG. 3. For clarity, only the microlens 316 is shown. The first plug microlens 316 has a lens center axis

400. As shown in FIG. 4B, there is a lens axis tolerance defined by a cone angle 402 of up to 0.5 degrees (+/−0.5 degrees from a perfectly aligned, or tolerance midpoint lens center axis) as a result of the first plug mechanical body tolerances, when engaging the first jack mechanical body. That is, due to "play" between the jack and plug housings, resulting from design and manufacturing tolerances, the lens axis may be misaligned as much as 0.5 degrees. Note: although misalignment is only shown in an XY plane, the lens axis tolerance may define a circular cone with respect to a perfectly aligned center axis.

The first plug microlens has a diameter 404 in the range of 2 to 3 mm, and the first collimated beam diameter (see FIG. 3, reference designator 346) is transceived within the microlens diameter 404. The first plug microlens 316 includes a cylindrical section 406 interposed between the planar surface 318 and the convex surface 320.

In one aspect, the first plug microlens cylindrical section 406 has a length 408 in the range of 4 to 6 mm and the convex surface 320 has a radius of curvature in the range of 1.5 to 2.5 mm. The second plug microlens, not shown, has the same lens dimensions and tolerances as the first plug microlens.

FIGS. 5A and 5B are partial cross-sectional and plan views, respectively, of the first plug of FIG. 3. A first plug cradle 500 has a channel or groove 502 to accept the fiber optic line first end 306 (not shown in FIG. 5A). The channel 502 has a center axis 504 with a tolerance 506 of up to 30 microns with respect to the lens center axis 400. Alternately stated, the center axis of the fiber line core may have a tolerance of up to 30 microns with respect to the lens center axis. The first plug includes a gap 508 between the microlens planar surface 318 and the first fiber optic cable first end of up to 0.4 mm. The second plug (not shown) likewise has a cradle, channel, dimensions, and tolerance as described above.

FIG. 6 is a partial cross-sectional view of the first plug microlens of FIG. 3. The first plug microlens modifies the magnification of light between the collimated beam 322 at convex surface 320 and a point 600 on the planar surface 318 along the lens center axis 400, forming a cone with an angle 602 of 10 to 11 degrees with respect the lens center axis 400. The second plug (not shown) likewise has the same magnification/demagnification features as the first plug microlens.

FIGS. 7A and 7B are drawings depicting a fiber optic cable with a cable section that includes a first plurality of fiber optic lines. In FIG. 7A, lines 304a through 304d are shown. Each fiber optic line 304 has a first end 306 and a second end 308. In the example of FIG. 7A, the first plurality is equal to four, but the cable section 302 is not limited to any particular number of lines. The first and second plugs 310/326 include the first plurality of microlenses, respectively 316a-316d and 332a-332d. Each microlens 316/332 has a planar surface 318/334 to engage a corresponding fiber optic line end and a convex surface 320/336 to transceive light in a corresponding collimated beam with a jack optical interface (not shown). Each fiber optic cable end 306/308 is formed in a focal plane 342/344 of a corresponding first plug microlens 316/332. A layer of cladding 700 is also shown surrounding the fiber cores 304. In one aspect the cladding diameter is about 0.49 mm and the core diameter is about 0.0625 mm. Typically, the cladding is covered with a buffer and plenum jacket, which is not shown because it is stripped away.

As shown in FIG. 7B, there may be multiple rows of microlenses, e.g., a top row and a bottom row. Note: a completely assembled plug would include top and bottom crimping plates (not shown), to secure the fiber lines 304 to the cradle 500. In one aspect, the first plug mechanical body has the form factor of an 8 Position 8 Contact (8P8C) plug mechanical body.

FIG. 8 is a diagram depicting communicating jack and plug microlens. A transmitting vertical-cavity surface-emitting laser (VCSEL) 800 has a numerical aperture (NA) of 0.259, so that light is emitted into a 30 degree cone at the $1/e^2$ point:

$$NA = \sin 15° = 0.259.$$

The NA of the fiber line 304 is 0.185, which translates into an acceptance angle cone of about 21 degrees.

One aspect of coupling efficiency is reflection (R). A normally incident reflection of ~4.9% is typical of each air/lexan interface. For rays not normally incident, R is a function of angle of incidence and polarization:

n for lexan@ 850 nm~1.568;
n' for air=1;
$R = ((n-n')/(n+n'))^2 \sim 4.9\%$;

Assuming each jack and plug use a microlens, there are 3 air-to-lexan interfaces. The fiber/plug interface is filled with index-matching fluid, so no reflection is assumed for this interface. The index matching fluid typically has a value in between that of the lens material index and air (1).

$$(1-0.049)^3 = 86\% \text{ optimal coupling efficiency.}$$

Figure 9:
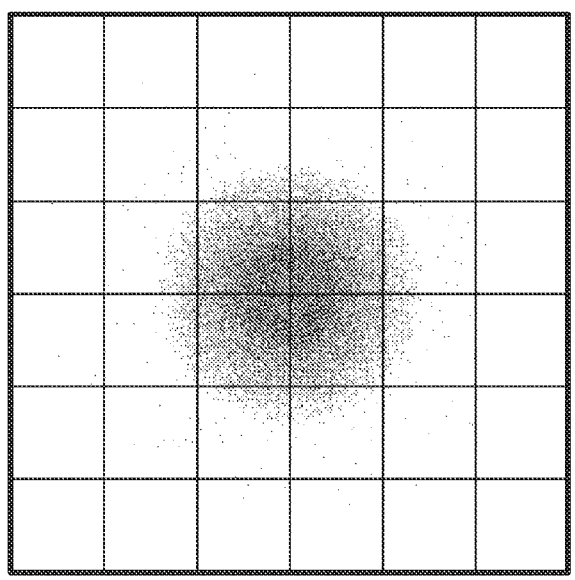
FIG. 9 is a model calculation graphically depicting the coupling efficiency of the system of FIG. 8.

FIG. 9 is a model calculation graphically depicting the coupling efficiency of the system of FIG. 8. The model shows that 86% of the transmitted light falls within a circle of about 0.07 mm, which is about the diameter of a particular POF optical fiber core.

Figure 10:
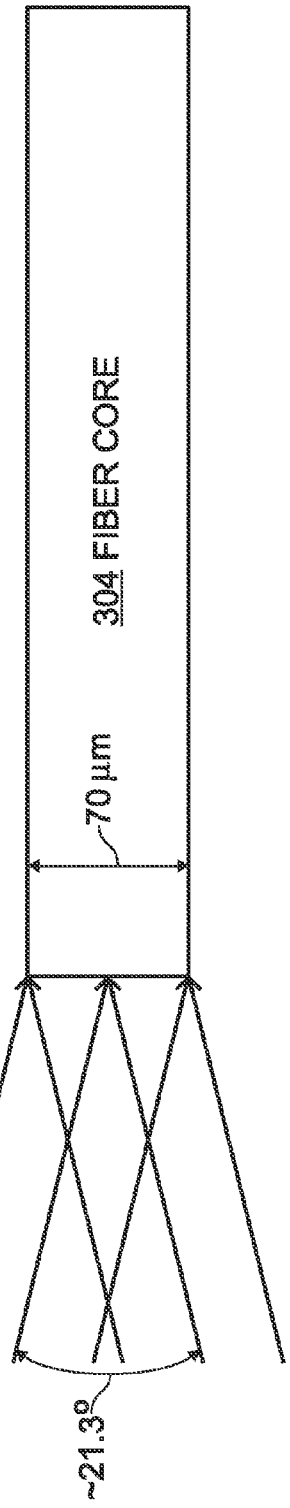
FIG. 10 is a diagram depicting the fiber core acceptance angle.

FIG. 10 is a diagram depicting the fiber core acceptance angle. Assuming a 70 micron diameter gradient index (GRIN) fiber core, the NA is 0.185, which translates to an acceptance angle of +/−10.7°. This assumption ignores the fact that the acceptance angle falls off towards to core edges.

Many of the system tolerances can be converted into an effective fiber lateral decenter. For example, VCSEL lateral decentering can be multiplied by the system magnification. Plug tilt can be accounted for by taking the taking the tangent of the tilt and multiplying it by the effective focal length of the plug lens. Most of the other tolerances tend to change the shape of the beam rather than causing the beam to "walk off" the face of the fiber end. With respect to the fiber line of FIG. 10, "lateral" refers to the X plane (in and out of the page) and Y plane (from the page top to the page bottom). The Z plane would be left to right on the page.

Figure 11:
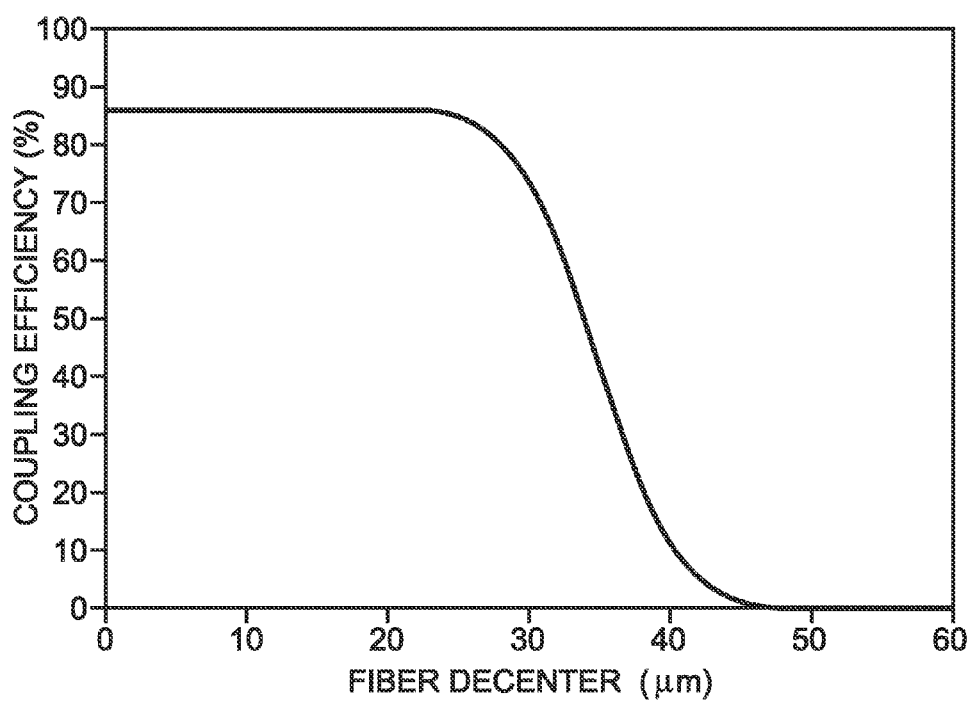
FIG. 11 is a graph depicting the relationship between coupling efficiency and fiber lateral decentering ($\Delta$).

FIG. 11 is a graph depicting the relationship between coupling efficiency and fiber lateral decentering (A). The relationship is nonlinear, steeply degrading at about 30 microns of decentering, or about half the core diameter.

Figure 12:
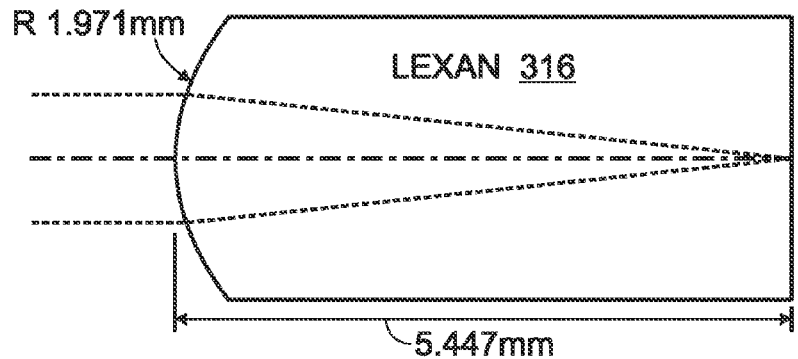
FIG. 12 is a diagram depicting the effective focal length of the plug microlens.

FIG. 12 is a diagram depicting the effective focal length of the plug microlens. Assuming a radius of curvature of 1.971 mm, an overall lens length of 5.447 mm, and a lexan material, the effective focal length of the plug is:

$eflplug \sim 5.447 \text{ mm}/n_{lexan}$;
$eflplug = 3.471 \text{ mm}$.

FIG. 13 is a table of tolerances cross-referenced to fiber lateral decentering.

The following is an equation for worst-case effective fiber decentering using tolerances T1 through T5 from the Table of FIG. 13:

$$\text{effective fiber decenter} =$$
$$T1(1.36) + T2(1.36) + 3.471\tan(T3) + T4 + T5; =$$

-continued $$1.36(T1+T2)+3.471[\tan(T3)]+T4+T5 \sim$$
$$1.36(T1+T2)+3.471(T3)+T4+T5$$

The tolerances T1 and T2 are proportional to the system magnification (1.36), and the lens tilt is expressed as a tangent in radians, assuming a small-angle approximation. Note: T2 circuit misalignment refers to the relationship between the circuit board on which the optical elements (VCSEL and PD) are mounted and the microlens. T1 VCSEL/PD misalignment refers to misalignment between the VCSEL/PD and the circuit board. The T4 and T5 tolerances are outside the system magnification, and need not be system normalized.

In matrix form the equation is:

$$[T1\ T2\ T3\ T4\ T5]\begin{bmatrix}1.36\\1.36\\3.471\\1\\1\end{bmatrix}$$

where
1.36=current system magnification;
3.471 mm=plug focal length; and,
Ti=ith tolerance.

Figure 14:
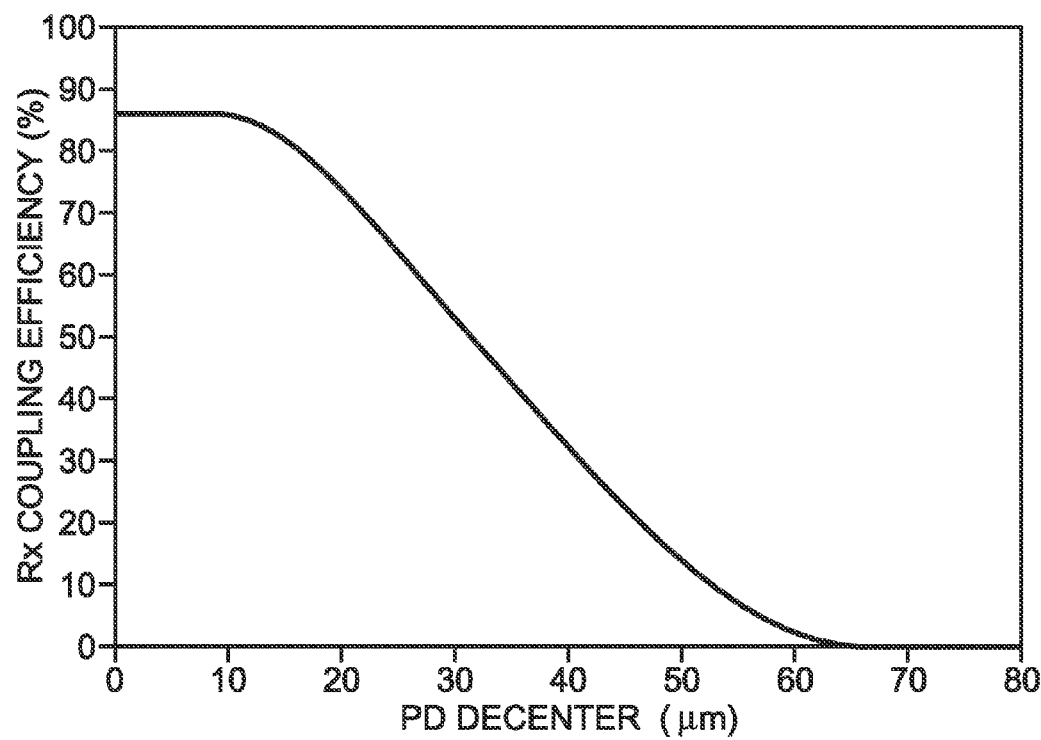
FIG. 14 is a graph depicting coupling efficiency as a function of photodiode (PD) decentering.

FIG. 14 is a graph depicting coupling efficiency as a function of photodiode (PD) decentering.

Figure 15:
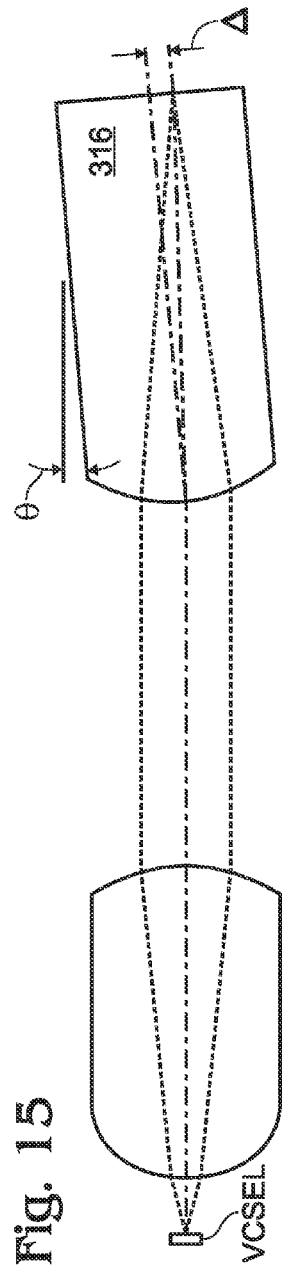
FIG. 15 is a diagram depicting the relationship between fiber decentering and lens tilt.

FIG. 15 is a diagram depicting the relationship between fiber decentering and lens tilt.

$$\Delta = \text{effective fiber decenter}$$
$$= fplug * \tan\theta;$$
$$= 3.471\ mm * \tan\theta;$$

If $\theta=0.5°$, then $\Delta=30.3\ \mu m$. Note: the angle $\theta$ has been exaggerated.

Figure 16:
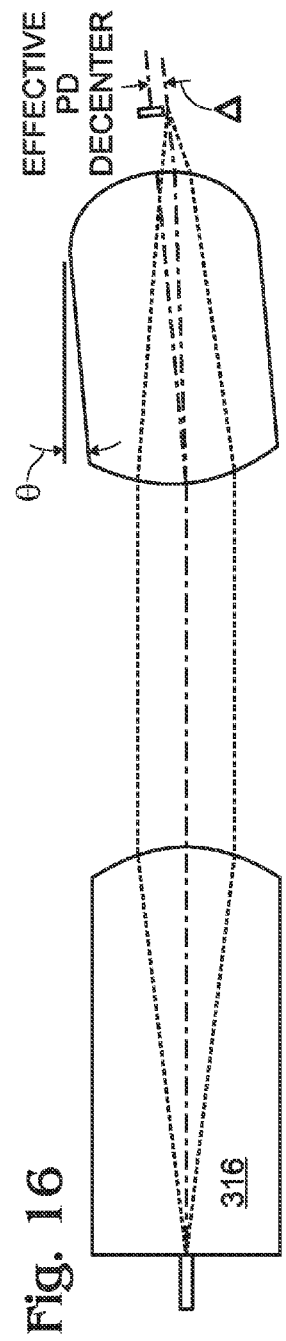
FIG. 16 is a diagram depicting the relationship between PD decentering and lens tilt.

FIG. 16 is a diagram depicting the relationship between PD decentering and lens tilt.

$$\Delta = \text{effective PD decenter}$$
$$= fjack * \tan\theta$$
$$= 2.504\ mm * \tan\theta$$

If $\theta=0.5°$, then $\Delta=21.9\ \mu m$.

Figure 17:
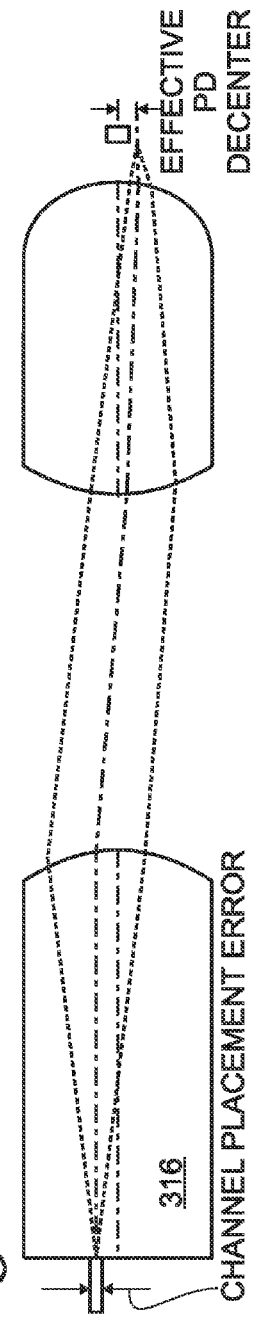
FIG. 17 is a diagram depicting the relationship between PD decentering and groove (channel) placement error.

FIG. 17 is a diagram depicting the relationship between PD decentering and groove (channel) placement error. The channel placement error may also be understood as a lens placement error relative to the channel.

The effective PD decenter=channel placement error*Msys;
where Msys is the system magnification (0.727=1/1.36).

A channel placement error of 7.1 μm results in effective PD decentering of 7.1 μm*0.727=5.2 μm in both the X and Y planes. The overall decentering (the hypotenuse of the triangle) is:

$$\text{sqrt}(5^2+5^2)=7.1\ \text{microns}.$$

A placement error of 10 microns results in a PD decentering of about 10 microns.

Figure 18:
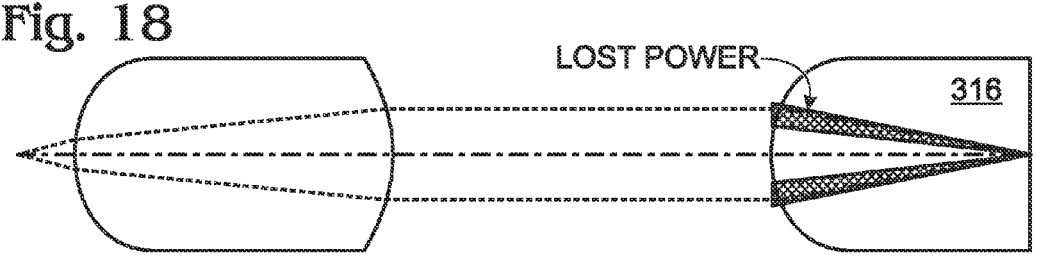
FIG. 18 is a diagram depicting the consequences of shortening the focal length of the plug, without a corresponding change in the jack lens.

FIG. 18 is a diagram depicting the consequences of shortening the focal length of the plug, without a corresponding change in the jack lens. If the plug focal length (fplug) is decreased, the loss in coupling efficiency due to plug angular misalignment can be reduced. However, the fiber core would be overfilled (exceeding the NA 0.185), which would result in some lost energy.

Figure 19:
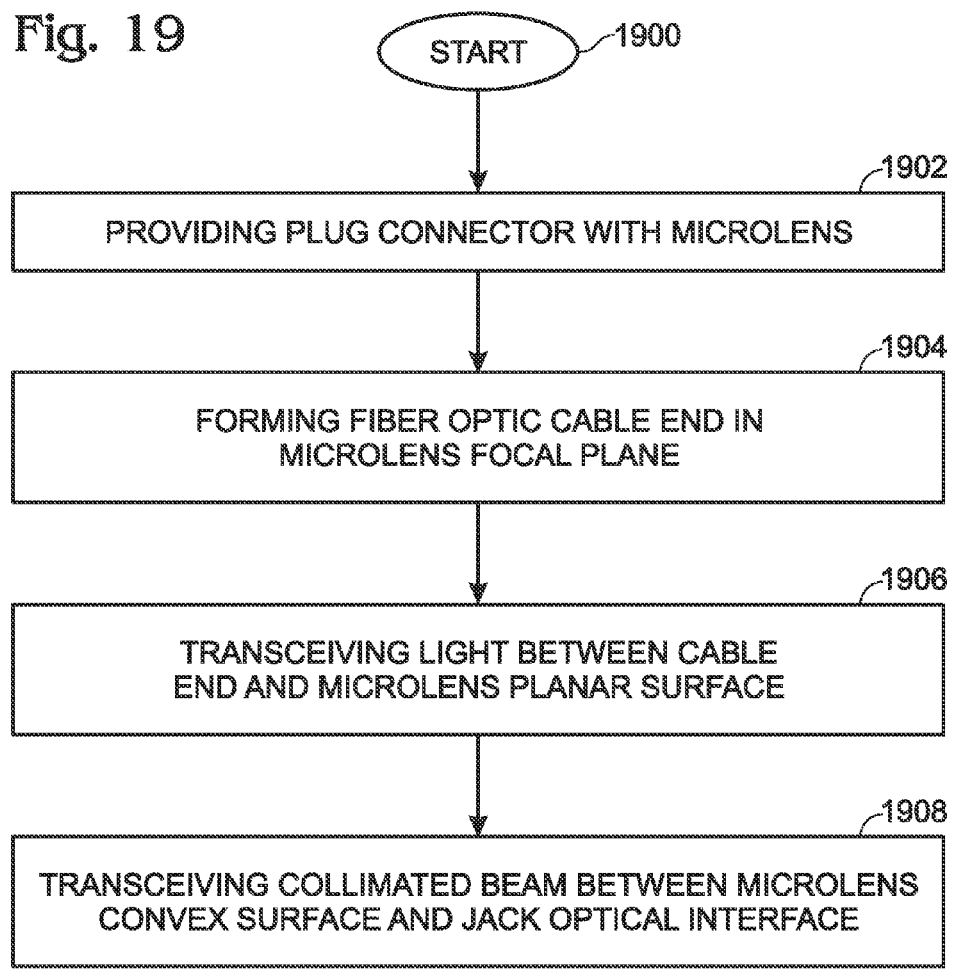
FIG. 19 is a flowchart illustrating a method for transceiving a collimated beam of light with a fiber optic cable plug connector.

FIG. 19 is a flowchart illustrating a method for transceiving a collimated beam of light with a fiber optic cable plug connector. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 1900.

Step 1902 provides a plug connector having a mechanical body shaped to engage a jack housing, and a microlens with a planar surface interfacing a fiber optic cable end, and a convex surface. Step 1904 forms the fiber optic cable end in a focal plane of the microlens. Step 1906 transceives light between the fiber optic cable and the microlens planar surface. Step 1908 transceives a collimated beam of light between the microlens convex surface and a jack optical interface.

A fiber optic cable and plug connector have been provided. Some examples of particular housing designs, tolerances, and dimensions have been given to illustrate the invention. However, the invention is not limited to merely these examples. Fiber optic cables have been shown ending with plugs, but alternately the fiber optical cable interfaces can be made using jacks instead of plugs, or a combination of a plug on one end and jack on the other end. Other variations and embodiments of the invention will occur to those skilled in the art.

We claim:

1. A fiber optic cable comprising:
a cable section including at least one length of fiber optic line having a first end and a second end;
a first plug including a mechanical body shaped to selectively engage and disengage a first jack housing without permanently fixing the first plug mechanical body to the first jack housing, a first plug microlens formed in the first plug mechanical body, the first plug microlens having a planar surface to engage the fiber optic line first end and a convex surface to transceive light in a first collimated beam with a first jack optical interface microlens, and an air gap cavity formed between the first plug microlens convex surface and the connected first jack connector microlens, the air gap cavity having a variable range of lengths subsequent to engaging the first jack housing with the first plug mechanical body;
a second plug including a mechanical body shaped to selectively engage and disengage a second jack housing without permanently fixing the second plug mechanical body to the second jack housing, and a second plug microlens formed in the second plug mechanical body, the second plug microlens having a planar surface to engage the fiber optic line second end and a convex surface to transceive light in a second collimated beam with a second jack optical interface microlens, and an air gap cavity formed between the second plug microlens convex surface and the connected second jack connector microlens, the air gap cavity having a variable range of lengths subsequent engaging the second jack, housing with the second plug mechanical body;

wherein, the fiber optic cable first end is formed in a focal plane of the first plug microlens; and, wherein, the fiber optic cable second end is formed in a focal plane of the second plug microlens.

2. The fiber optic cable of claim 1 wherein the first plug microlens has a first plug microlens center axis, and a first plug microlens axis tolerance defined by a cone angle of up to 0.5 degrees as a result of the first plug mechanical body tolerances, when engaging the first jack mechanical body; and, wherein, the second plug microlens has a second plug microlens center axis, and a second plug microlens axis tolerance defined by a cone angle of up to 0.5 degrees as a result of the second plug mechanical body tolerances, when engaging the second jack mechanical body.

3. The fiber optic cable of claim 2 further comprising:

a first plug cradle with a channel to accept the fiber optic line first end, wherein the channel has a center axis with a tolerance of up to 30 microns with respect to the first plug microlens center axis; and, a second plug cradle with a channel to accept the fiber optic line second end, wherein the channel has a center a is with a tolerance of up to 30 microns with respect to the second plug microlens center axis.

4. The fiber optic cable of claim 1 wherein the first plug microlens transceives the first collimated beam with a beam diameter in a range of 1.2 to 1.3 mm; and, wherein the second plug microlens transceiver the second collimated beam with a beam diameter in a range of 1.2 to 1.3 mm.

5. The fiber optic cable of claim 4 wherein the first plug microlens has a diameter in a range of 2 to 3 mm, and wherein the first collimated beam diameter is transceived within the first plug microlens diameter; and, wherein, the second plug microlens has a diameter in a range of 2 to 3 mm, and wherein the second collimated beam diameter is transceived within the second plug microlens diameter.

6. The fiber optic cable of claim 1 wherein the first plug microlens includes a cylindrical section interposed between the planar surface and the convex surface; and, wherein the second plug microlens includes a cylindrical section interposed between the planar surface and the convex surface.

7. The fiber optic cable of claim 6 wherein the first plug microlens cylindrical section has a length in a range of 4 to 6 mm and the convex surface has a radius of curvature in a range of 1.5 to 2.5 mm; and, wherein the second plug microlens cylindrical section has a length in a range of 4 to 6 mm and the convex surface has a radius of curvature in a range of 1.5 to 2.5 mm.

8. The fiber optic cable of claim 7 wherein the first plug includes a gap between the first microlens planar surface and the first fiber optic cable first end of up to 0.4 mm; and, wherein the second plug includes a gap between, the second plug microlens planar surface and the first fiber optic cable second end of up to 0.4 mm.

9. The fiber optic cable of claim 1 wherein the cable section includes a first plurality of fiber optic lines, each having a first end and a second end;

wherein, the first plug includes a first plurality of first plug microlenses, each first plug microlens having a planar surface to engage a corresponding fiber optic line first end and a come surface to transceive light in a collimated beam with corresponding first jack optical interface microlens, and each first plug microlens convex surface forming an air gap cavity between a corresponding microlens of the connected first jack connector;

wherein the second plug includes a first plurality of second plug microlenses, each second plug microlens having a planar surface to engage a corresponding fiber optic line second end and a convex surface to transceive light in a collimated beam with a corresponding second jack optical interface microlens, and each second plug microlens convex surface forming an air gap cavity between a corresponding microlens of the connected first jack connector;

wherein each fiber optic cable first end is formed in a focal plane of the corresponding first plug microlens; and, wherein each fiber optic cable second end is formed in a focal plane of the corresponding second plug microlens.

10. The fiber optic cable of claim 1 where the first and second plug microlenses are made from a polycarbonate resin thermoplastic selected from a group consisting of lexan and ultem.

11. The fiber optic cable of claim 1 wherein the first and second, plug microlenses each have a focal length in a range of 2 to 4 mm.

12. The fiber optic cable of claim 1 wherein the first and second plug microlenses each modify the magnification of light between the collimated beam at their respective convex surfaces and a point on their respective planar surfaces along a microlens center axis, each forming a cone with an angle of about 10 to 11 degrees with respect the microlens center axis.

13. A method for transceiving a collimated beam of light with a fiber optic cable plug connector, the method comprising:

providing a plug connector having a mechanical body shaped to engage a jack housing without permanently fixing the plug mechanical body to the jack housing, a microlens formed in the mechanical body with a planar surface interfacing a fiber optic cable end and a convex surface, and an air gap cavity formed between the plug microlens convex surface and a microlens of a connected jack connector, the air gap cavity having a variable range of lengths subsequent to engaging the jack housing with the plug mechanical body;

forming the fiber optic cable end in a focal plane of the microlens;

transceiving light between the fiber optic cable and the microlens planar surface; and, transceiving a collimated beam of light between the microlens convex surface and a jack optical interface microlens.

14. An optic cable plug connector, the plug connector comprising:

a mechanical body shaped to selectively engage and disengage a jack housing without permanently fixing the plug mechanical body to the jack housing;

a microlens formed in the mechanical body having a convex surface to transceive light in a first collimated beam with a jack optical interface microlens, and a planar surface to engage a fiber optic line end, where the fiber optic cable end is formed in a focal plane of the microlens and, an air gap cavity formed between the plug microlens convex surface and the connected jack connector microlens, the air gap cavity having a variable range of lengths subsequent to engaging the jack housing with the plug mechanical body.

15. The plug connector of claim 14 wherein the microlens has a microlens center axis, and a microlens axis tolerance defined by a cone angle of up to 0.5 degrees as a result of the mechanical body tolerances, when engaging a jack mechanical body.

16. The plug connector of claim 15 further comprising:
a cradle with a channel to accept the fiber optic line first end, wherein the channel has a center axis with a tolerance of up to 30 microns with respect to the microlens center axis.

17. The plug connector of claim 14 wherein the microlens transceives the first collimated beam with a beam diameter in a range of 1.2 to 1.3 mm.

18. The plug connector of claim 17 wherein the microlens has a diameter in a range of 2 to 3 mm, and wherein the first collimated beam diameter is transceived within the microlens diameter.

19. The plug connector of claim 14 wherein the microlens includes a cylindrical section interposed between the planar surface and the convex surface.

20. The plug connector of claim 19 wherein the microlens cylindrical section has a length in a range of 4 to 6 mm and the convex surface has a radius of curvature in a range of 1.5 to 2.5 mm.

21. The plug connector of claim 14 further comprising:
a plurality of microlenses, each microlens having a planar surface to engage a corresponding fiber optic line first end and a convex surface to transceive light in a collimated beam with a corresponding first jack optical interface microlens, and where each fiber optic cable end is formed in a focal plane of the corresponding microlens; and,
a plurality of air gap cavities formed between each plug microlens convex surface and the corresponding connected jack connector microlens.

22. The plug connector of claim 14 where the microlens is made from a polycarbonate resin thermoplastic selected from a group consisting of lexan and ultem.

23. The plug connector of claim 14 wherein the microlens has a focal length in a range of 2 to 4 mm.

24. The plug connector of claim 14 wherein the microlens modifies the magnification of light between the collimated beam at the convex surface and a point on the planar surface along a microlens center axis, forming a cone with an angle of 10 to 11 degrees with respect the microlens center axis.

* * * * *